(12) United States Patent
Kannan et al.

(10) Patent No.: US 11,868,339 B2
(45) Date of Patent: Jan. 9, 2024

(54) BLOCKCHAIN BASED DISTRIBUTED FILE SYSTEMS

(71) Applicant: Hewlett Packard Enterprise Development LP, Houston, TX (US)

(72) Inventors: Rajkumar Kannan, Bangalore Karnataka (IN); Aruna Srinivasa Murthy, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 195 days.

(21) Appl. No.: 16/946,062

(22) Filed: Jun. 4, 2020

(65) Prior Publication Data

US 2021/0124732 A1    Apr. 29, 2021

(30) Foreign Application Priority Data

Oct. 23, 2019 (IN) .............................. 201941042949

(51) Int. Cl.
  *G06F 16/23* (2019.01)
  *G06F 16/182* (2019.01)

(52) U.S. Cl.
  CPC ........ *G06F 16/2379* (2019.01); *G06F 16/182* (2019.01)

(58) Field of Classification Search
  CPC .... G06F 16/2379; G06F 16/182; G06F 9/466; G06F 16/93; G06F 21/6218; G06F 16/13; G06F 21/64; G06F 16/128; G06F 16/2365; G06F 21/602; G06F 16/2228; G06F 2201/84; G06F 16/245; H04L 9/50; H04L 9/0637; H04L 9/3247; H04L 9/3239; H04L 9/0643; H04L 63/123

USPC ........................................................ 707/703
See application file for complete search history.

(56) References Cited

U.S. PATENT DOCUMENTS

| | | | |
|---|---|---|---|
| 10,033,702 B2 | 7/2018 | Ford et al. | |
| 10,986,097 B2 | 4/2021 | Sloane et al. | |
| 2014/0317157 A1 | 10/2014 | Sparkes et al. | |
| 2017/0126702 A1 | 5/2017 | Krishnamurthy | |
| 2017/0177898 A1* | 6/2017 | Dillenberger | G06F 21/6227 |
| 2017/0220426 A1 | 8/2017 | Sankar et al. | |
| 2017/0228371 A1 | 8/2017 | Seger, II | |
| 2017/0236123 A1 | 8/2017 | Ali et al. | |
| 2017/0352116 A1 | 12/2017 | Pierce et al. | |

(Continued)

FOREIGN PATENT DOCUMENTS

WO    2016/148738 A1    9/2016

OTHER PUBLICATIONS

Corda Documentation, "Corda OS 4.5: Writing a Contract", available online at <https://docs.corda.net/docs/corda-os/4.5/tutorial-contract.html>, retrieved on Oct. 16, 2020, 13 pages.

(Continued)

*Primary Examiner* — Evan Aspinwall
(74) *Attorney, Agent, or Firm* — Trop, Pruner & Hu, P.C.

(57) ABSTRACT

Examples include a blockchain system associated with a distributed file system, Some examples include retrieval, from the blockchain system, a latest block corresponding to a block signature of a reference block that corresponds to a file stored in the distributed file system. The latest block includes information identifying at least one of a latest location of the file, a signature of metadata of the file, or a tag associated with the file.

21 Claims, 5 Drawing Sheets

(56) References Cited

U.S. PATENT DOCUMENTS

| | | | |
|---|---|---|---|
| 2018/0060836 | A1 | 3/2018 | Castagna |
| 2018/0137131 | A1 | 5/2018 | Karuppusamy et al. |
| 2018/0189301 | A1 | 7/2018 | Kannan et al. |
| 2018/0260212 | A1 | 9/2018 | Wisnovsky |
| 2019/0012666 | A1 | 1/2019 | Krauss et al. |
| 2019/0013934 | A1* | 1/2019 | Mercuri ............... G06N 20/00 |
| 2019/0079950 | A1 | 3/2019 | Ramabaja |
| 2019/0251295 | A1 | 8/2019 | Vieyra |
| 2019/0303621 | A1 | 10/2019 | Baset et al. |
| 2019/0324958 | A1* | 10/2019 | Ow ...................... H04L 9/0637 |
| 2019/0354725 | A1* | 11/2019 | Lowagie ............... H04L 9/0891 |
| 2019/0372756 | A1* | 12/2019 | Kim ..................... H04L 9/3263 |
| 2020/0057860 | A1 | 2/2020 | Patil et al. |
| 2020/0097961 | A1 | 3/2020 | Luo et al. |
| 2020/0104294 | A1 | 4/2020 | Alas et al. |

OTHER PUBLICATIONS

Edicom, "Blockchain and Electronic Data Archiving: Evidence Protection", available online at <https://www.edicomgroup.com/en_US/news/11506-blockchain-and-electronic-data-archiving-evidence-protection.html>, May 7, 2018, 4 pages.

GitHub, "ethereumbook: What is a Smart Contract?", available online at <https://github.com/ethereumbook/ethereumbook/blob/develop/07smart-contracts-solidity.asciidoc#what-is-a-smart-contract>, Jul. 11, 2020, 35 pages.

Hyperledger, "Hyperledger Architecture, vol. II: Smart Contracts", Apr. 2018, pp. 1-14.

Kang et al., "Blockchain for Secure and Efficient Data Sharing in Vehicular Edge Computing and Networks", IEEE, 2012, pp. 1-12.

Sutton et al., "Blockchain Enabled Privacy Audit Logs", Research Gate, Oct. 2017, 17 pages.

Wikipedia, "Blockchain", available online at <https://en.wikipedia.org/w/index.php?title=Blockchain&oldid=893385950>, Apr. 21, 2019, 17 pages.

Corda, "An Open Source Blockchain Platform for Businesses", available online at <https://web.archive.org/web/20190723020648/https://www.corda.net/>, Jul. 23, 2019, 7 pages.

Ethereum Foundation, "Ethereum Project", available online at <https://web.archive.org/web/20170928113351/http://ethereum.org/>, Sep. 28, 2017, 11 pages.

Hearn et al., "Corda: A distributed ledger", Version 1.0, Technical-Whitepaper—Aug. 20, 2019, pp. 1-73.

Linux Foundation, "About—Hyperledger", available online at <https://web.archive.org/web/20191016165912/https://www.hyperledger.org/about>, Oct. 16, 2019, 7 pages.

Hewlett Packard Enterprise Development LP, "HPE 3PAR File Persona User Guide: HPE 3PAR OS 3.3.1", Edition 1, P30182-001, Jul. 2020, pp. 1-276.

Hewlett Packard Enterprise Development LP, "HPE 3PAR StoreServ Management Console 3.4 User Guide", Ed. 1, No. QL226-99896a, Sep. 2018, pp. 1-208.

Hewlett Packard Enterprise Development LP, "Technical Overview of HPE 3PAR File Persona Software: Truly converged file and object access for HPE 3PAR StoreServ Storage", Technical white paper, Rev. 8, Apr. 2020, pp. 1-25.

Micobo GmbH, "Technical difference between Ethereum, Hyperledger fabric and R3 Corda", available online at <https://medium.com/@micobo/technical-difference-between-ethereum-hyperledger-fabric-and-r3-corda-5a58d0a6e347>, Medium, Mar. 16, 2018, 13 pages.

R3, "Smart Legal Contracts on Enterprise Blockchains: A Corda Example", available online at <https://www.r3.com/blog/smart-legal-contracts-on-enterprise-blockchains-an-r3-corda-example/>, Aug. 21, 2019, 3 pages.

* cited by examiner

BLOCKCHAIN BASED DISTRIBUTED FILE SYSTEMS

BACKGROUND

Increasing use of data processing and data generation in enterprises produce increasing amounts of data which may be stored for short or long periods. Such data may be used by the organizations for carrying out one or more operations. In some scenarios, certain data may be retained for long periods to maintain reliable records of some events. In some examples, sensitive or compliance data, such as health care records, customer records or financial data, may be shared, replicated, or retained online in order to satisfy various information system requirements such as performance, availability, and recovery. As a result, storage systems may be vulnerable to security breaches, which may result in damaging losses.

BRIEF DESCRIPTION OF THE DRAWINGS

The following detailed description references the drawings, wherein.

DETAILED DESCRIPTION

Figure 1:
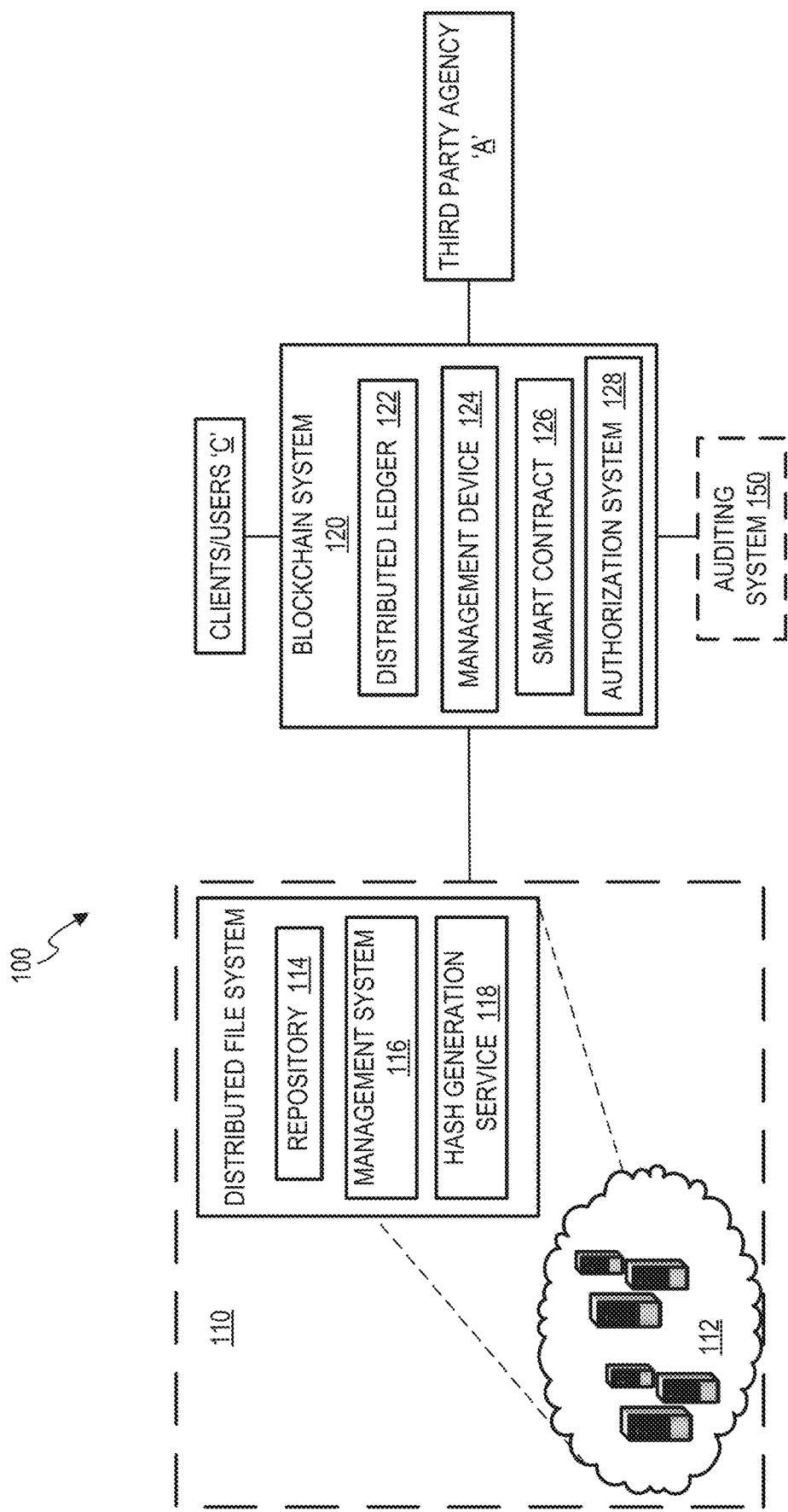
FIG. 1 is a block diagram of an example computing environment including a distributed file system associated with a blockchain system for at least determining a location of a file or auditing a file stored in the distributed file system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two as or more than two. The term "another," as used herein, is defined as at least a second or more. The term "associated," as used herein, is defined as connected or coupled, whether directly without any intervening elements or indirectly with at least one intervening element, unless otherwise indicated. Two elements can be connected mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise.

For storage systems, supporting compliance standards may involve meeting several compliance requirements. Though the data may be protected through the use of safe channels and encryption, challenges related to the credibility of a system remain, as do traceability issues. Furthermore, a variety of different issues may be encountered while managing distributed file systems. For example, in a system with billions of records, data traceability, lookup, security, and auditing may be complex and time consuming processes. In addition, operating a storage solution may involve managing compliance with appropriate policies and submitting to external audits to prove that compliance. Operating a storage system may also involve transparent protection and preservation of data for end customers and protection of the system from malicious attacks on data through breach and theft.

Examples described herein provide integrated systems and simple methods that may allow for maintaining a distributed ledger (e.g., including creating blocks in a distributed ledger), determining a location of a file or performing audit on a file (e.g., to validate the consistency of a file) using a blockchain system. Use of the blockchain system, in such systems, may provide a highly secure system for maintaining a distributed ledger, determining a location of a file or performing audit on a file. In examples described herein, an integrated system involving a blockchain system may provide both identification of records as well as information to enable determining respective locations of and performing audits on many compliance records (e.g., billions of records) using their block identity as well as various attributes of data (e.g., metadata or tags). For example, the blockchain system may act as a resource for determining a location of a file, as well as an index that can help in managing the process of performing audits for records in a highly distributed file system. Thus, the integrated systems may allow simple and time saving processes for performing lookups and audits for records without accessing the records themselves. For example, for a file stored in a distributed file system, examples described herein may enable searching in the blockchain system for information related to the file (e.g., its location or transaction records), rather than locating the file itself in the distributed file system.

A "blockchain" may include a public or private digital ledger for maintaining records of a sequence of executed transactions in blocks, which are linked cryptographically. In such examples, a "block" of a blockchain may be a unit of data recordation for the blockchain. In such examples, a given block of a blockchain may contain information to record (e.g., identifying or indicating) a given transaction, and a block signature (for example, a hash or cryptographic hash) of a prior block to link the given block and the prior block. This way, blocks may be chained together in the blockchain by including in a given block the signature of a prior block of the blockchain. Such chaining of blocks may enable confirmation of the integrity of block in a blockchain and make it difficult to alter a block in the blockchain without such alteration being readily detectable. In some examples, a blockchain may be implemented by a blockchain system, which may comprise a plurality of computing devices to implement the blockchain system. In such examples, the blockchain system may implement a blockchain as a distributed ledger, which is a form of a decentralized database that may be stored at one or more entities participating in the blockchain system (e.g., blockchain nodes, such as respective computing devices). In such examples, each entity participating in a blockchain system may get a copy of the blockchain (i.e. the distributed ledger), which may be downloaded automatically upon enrolling (e.g., registering as per a registration model to access the blockchain system) for the blockchain system. At least some blockchain nodes may maintain the blockchain and cryptographically validate each new block added to the blockchain, and the transaction(s) represented in the corresponding block. The blockchain system may record information identifying the blockchain nodes and information identifying an owner of each block. An owner of a block may be a blockchain node that provides data to create that block in the distributed ledger.

The term "block signature", as used herein, refers to an identifier for a block in a blockchain. In an example, the block signature of a block in a blockchain may be a signature generated based on a content of the block in any suitable manner (e.g., via a digital signature function, hash function, or the like) to produce a representation of the block signature in any suitable form (e.g., a numeric string, alphanumeric string, of the like). In some examples, a block signature for a block may be a cryptographic hash generated at the creation of the block in the blockchain.

In a blockchain system, a series of blocks may be generated in a distributed ledger to record information related to executed (i.e., performed) transactions. In examples described herein, a given block may include information corresponding to an action performed while performing a transaction in relation to a given file stored in a distributed file system. For example, a block for the given file may comprise information identifying owner of the block, information identifying the action performed, information identifying a signature of data content of the given file, a timestamp of creation of the block, and one or more of information identifying a latest location of the given file, a signature of metadata of the given file or a tag associated with the given file. In addition, new blocks corresponding to additional transactions in relation to the given file may be created over time that include additional information (e.g., to represent respective actions performed while performing executed transactions). In such examples, to record an action performed while performing a transaction in relation to a file, a new block for the given file may be added to the distributed ledger. Further, each new block for a given file may include a block signature of a prior block for the given file. In examples described herein, for a given block for a given file in a blockchain, a "prior block" may refer to a block in the blockchain for the same given file and that is the last-created block for the given file that was created before the creation of the given block (i.e., such that the blockchain contains no intervening block between the prior block and the given block for the given file). In this manner, the blocks corresponding to the actions performed while performing transactions in relation to a file may be "chained" together to form a series of blocks in a distributed ledger. In such examples, each additional block may create additional security for the validity of the entire distributed ledger. This makes it difficult to retroactively alter data stored within the distributed ledger without that alteration being detected. The series of block in the distributed ledger may include each created block, including the first block for a given file to a latest block (also referred to as a most recent block) for the given file. Accordingly, in such examples, use of a blockchain system may enable to record transactions in relation to files stored in a distributed file system with high security, and an ability to detect changes to the records (e.g., in the case of corruption, breach, etc.).

As used herein, the terms such as "data" or "record" may be used to refer to any type of data stored or recorded in a distributed file system or a distributed ledger. In an example, data and record, individually, may include one or more files or information related to the files.

The term "latest block", as used herein, may refer to the most recent block created for a given file in a distributed ledger, and that corresponds to the last recorded or the most recent action (of a most recent transaction) performed in relation to a file.

Further, as noted, a blockchain system may be implemented as a public or a private distributed ledger. In a private distributed ledger, the access to the distributed ledger may be restricted for securing its privacy. For example, in such implementations, participating entities of the blockchain system may be assigned with certain protocols and permissions to access the distributed ledger. For example, some participating entities may have only read permissions while other participating entities may have read and write permissions. In these implementations, each participating entity may need to enroll with the blockchain system according to a registration model to use or access the distributed ledger. The registration model may involve a subscription fee depending on the purpose of an enterprise. The registration model may involve a subscription fee depending on the purpose of an enterprise. In some examples, the enrollment may be a part of an overall blockchain system for a user. In some examples, a third party agency may have to get enrolled through the registration model.

Some participating entities, for example, may access data pertaining only to them via public-private key encryption. In this example, data on the private distributed ledger may be relevant to a given participating entity that may be encrypted using a blockchain public key such that only a blockchain private key can decrypt its contents.

In an example of the present subject matter, a computing environment may include a blockchain system associated with a distributed file system that includes a plurality of files stored therein. Some examples described herein may utilize the blockchain system to maintain a database, in a distributed ledger, for the files stored in the distributed file system. In an example, the blockchain ledger may include a series of blocks corresponding to a file. In such example, each block in the series of blocks may include information identifying an action performed while performing a transaction in relation to the file and a block signature of the prior block. Further, in examples described herein, each block may comprise one or more of information identifying a latest location of the file, a signature of metadata of the file or a tag associated with the file.

As used herein, the term "signature of metadata of a file" may refer to an identifier for the metadata of the file. In an example, the signature of metadata of a file may be a hash created for the metadata of the file stored in a distributed file system. The term "signature of data content of a file" may refer to an identifier for the data content of the file. In an example, the signature of data content of a file may be a hash created for the data content of the file stored in a distributed file system.

In some examples, the present subject matter provides methods and systems for maintaining a distributed ledger for a distributed file system. The method may include receiving, by a management device of the blockchain system, information identifying an action performed while performing a transaction in relation to a file stored in the distributed file system; and creating a respective block, in the distributed ledger, for each action performed while performing the transaction in relation to the file. In such examples, each created block may include information identifying the action performed while performing the transaction in relation to the file and a block signature of the prior block. In some examples, each created block may be a block of the distributed ledger. In examples described herein, each block may further comprise one or more of information identifying a latest location of the file, a signature of metadata of file, or a tag associated with the file. In some examples, each created block may include information identifying a latest location of the file in the distributed file system. In an example, information identifying the latest location of the file may comprise a latest directory path for the file in the distributed file system. In some examples, each created block may include information identifying a signature of metadata of the file. In an example, information identifying the signature of metadata the file may comprise a signature key that may include the signature of metadata of the file and the signature of data content of the file. In some examples, each created block may include a tag associated with the file. In some other examples, each created block may include additional file attributes such as file type, creation date, modification date, retention time, expiration time, retention state, tier, user ID, Group ID, or the like.

The term, "information identifying a latest location of a file", as used herein, may refer to information present in a latest-created block in a blockchain for a given file, the information identifying a location of the file in a distributed file system. The information identifying a location of the file may represent the location of the file in the distributed file system at the time that the block including the information was created (e.g., to record a most recent action performed in relation to the file). In examples, described herein, each block may include file attributes of a file, representative of those file attributes at the time of creation of the block (e.g., corresponding to a transaction in relation to the file).

In an example, any number of tags associated with a file, which may be generated to satisfy specific needs of identifying or using the file, may be included in each created block corresponding to an action performed while performing a transaction in relation to the file. For example, if the file is a medical record such as an X-ray image, the tags could include a patient name, identification of the area being imaged, date that the X-ray was performed, doctor name, and the like. In some examples, a set of files may be identified corresponding to a tag. In some examples, the latest locations of each file of the identified set of files may be determined through the blockchain system 120. In some examples, audit on each file of the identified set of files may be performed through the blockchain system 120.

Inclusion of various information related to the file, including additional file attributes, in the blocks of the distributed ledger may enable to determine a location of a file in the distributed file system and perform audit on the file for validating the consistency of the files over a period of time. In some examples, the present subject matter provides methods and systems for determining a location of a file stored in the distributed file system through the blockchain system. In some examples, the present subject matter provides methods and systems for performing audit on a file based on transaction records in the distributed ledger, through the blockchain system, to validate the consistency of the file.

The systems and methods of the present subject matter are further described with reference to FIGS. 1-8. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

Although the one or more portions of the description herein are with reference to one file of the distributed file system, the methods and described techniques may be utilized for several files. Furthermore, many process and functions performed by the blockchain system, as described herein, may be performed by one or more components of the blockchain system. Various implementations of the present subject matter have been described below by referring to several examples.

FIG. 1 is a block diagram of an example computing environment 100 including a distributed file system 110 that may store a plurality of files in one or more storage systems 112, and a blockchain system 120 associated with the distributed file system 110. The blockchain system 120 may record each transaction performed in relation to a file of the plurality of files. In an example illustrated in FIG. 1, the blockchain system 120 includes a distributed ledger 122 that includes a series of blocks and a management device 124 that perform several functions to update and retrieve information from the distributed ledger 122. In such examples, the management device 124 may perform these functions according to various blockchain protocols and specifications. In an example, the blockchain system 120 may further include a smart contract 126 that is a deterministic module executed within a sandbox, ensuring that a transaction in relation to a file is valid and unique. In the example as described herein, the distributed ledger 122 may be implemented as a private distributed ledger. In such examples, the blockchain system 120 may further include an authorization system 128 to permit or restrict a node, for example a client/user 'C' or a third party agency 'A' to access the distributed ledger 122.

Most of the functionalities described herein as performed by blockchain system 120 (e.g., performed by any of distributed ledger 122, management device 124, smart contract 126, and authorization system 128) may be performed by at least one processing resource of at least one computing device executing instructions to perform those functionalities described herein.

In an example, the blockchain system 120 may be communicatively associated with various components of the computing environment for example, the distributed file system 110 via a wired or wireless network. In examples described herein, the network may include, for example, a local area network (LAN), a virtual LAN (ULAN), a wireless local area network (WLAN), a virtual private network (VPN), the Internet, or the like.

In an example, the blockchain system 120 may be associated with a plurality of nodes. The plurality of nodes may include one or more storage systems 112, one or more clients/users 'C', one or more third party agencies 'A' or combinations thereof, that may access one or more files of the plurality of files stored in the distributed file system 110. A node of the plurality of nodes may have a role based access to the blockchain system 120 according to the registration model (described previously) or the rules that define the blockchain protocols and specifications. For example, a client may have read and write access while a third party agency that performs audit of one or more files may have read only access. Further, as alluded previously, in some examples, the nodes of the plurality of nodes may access the distributed ledger 122 in the blockchain system 120 through the authorization system 128 that may permit or restrict respective node to access the distributed ledger 122 according to the registration model or the rules that define the blockchain protocols and specifications.

In an example, two or more nodes of the plurality of nodes may be participating entities of the blockchain system 120. In such example, the distributed ledger 122 may be available to each participating entity of the blockchain system 120. In an example, each storage system 112 of the distributed file system 110 may be a participating entity of the blockchain system 120.

In some examples, a node of the plurality of nodes may not be a participating entity of the blockchain system 120. For example, a third party agency that may perform audit on the one or more files stored in distributed file system 110, through the blockchain system 120, may not be a participating entity to the blockchain system 120. In such examples, the third party agency may have read only access to the distributed ledger 122 to perform audit on the one or more files stored in the distributed file system 110.

As described in above example, the distributed file system 110 may include one or more storage systems 112 that may be used in an enterprise. A storage system 112 may be a primary or a secondary storage system including, but are not limited to, a computing device, a server, a storage array, cloud or the like. In an example, each storage system 112 in the distributed file system 110 may be a participating entity of the blockchain system 120.

In an example of FIG. 1, the distributed file system 110 may comprise a decentralized file system that records information about each file of the plurality of files, at the time of storing respective files in the distributed file system 110. In some examples, the decentralized file system may be implemented as an Inter Planetary File System (IPFS). In an example, the decentralized file system may include a repository 114. In such examples, the repository 114 may include information including various file attributes of each file of the plurality of files such as, file name, type of file, size of file, timestamp of the creation of the file, signature of metadata of the file, signature of data content of the file, tags associated with the file, a status of the file, retention-state of the file, retention period of the file, a block signature of a reference block (described later), in the distributed ledger, corresponding to the file, etc.

In the example illustrated in FIG. 1, the distributed file system 110 may further include a management system 116, a signature generation service 118 and/or other components. The management system 116 may manage the files of the plurality of files stored in the distributed file system 110 by for example, storing the files in one or more storage systems 112, shifting a file from one location to another location in the distributed file system 110 and performing a transaction in relation to a file of the plurality of files. Any functionality described herein as performed by the management system 116 may be performed by at least one processing resource executing instructions to perform the functionality described herein.

As used herein, the term "transaction" may refer to an operation performed on a file that causes a change in the file. In an example, a transaction performed in relation to a file may be according to a verified operation (that may be allowed to be performed on the file) as per the smart contract 126. A transaction in relation to a file may include one or more operations including a file operation (e.g., a natural file operation), an operation to access of the file (e.g., a natural access to the file), an operation to change a status of the file, an operation to change a location of the file, or an operation for a retention-state transition of the file or the like. For the purposes of this disclosure, the word "natural," as it may pertain to natural file operations, natural access of a file or the like may refer to operations that may be performed in relation to a file in the natural operation of a computing device and/or a file system. For example, users or applications may access (e.g., via a file system) a file or metadata to carry out the purpose of the user or the application. Examples of natural operations include a file read, a file write, a command to read the metadata of a file (e.g., getattr( )), a command to write the metadata of a file (e.g., setattr( )) or the like. An operation to change a status may include deletion or creation of the file. An operation to change a location of the file may include moving the file from one location to another location for space management in the distributed file system 110. In an example, the management system 116 may move a file from one storage system (for example, a server) to another storage system (for example, cloud) in the distributed file system 110.

In some scenarios, certain data that includes one or more files in the plurality of files of the distributed file system 110 may need to be retained for a period of time (a "retention period"). For example, regulatory authorities and/or enterprise may require such retention of data. Data may be required to be retained, for example, to maintain a reliable record of certain events (for example, stock exchange transactions). During such a retention period, data subject to retention may be required to be protected against any change, and/or deletion. For example, a write-once-read-many (WORM) data retention state may be used to retain electronic data in immutable form (i.e. not susceptible to change). As used herein, the term "retention-state" may refer to a retention protection received for a file under a retention policy for a period of time, as per compliance standards. As used herein, the term "compliance standards" may refer to standards given by regulatory authorities and/or enterprises as per internal policies, and federal and state laws. The retention policy may be tightly integrated with the decentralized file system and metadata of the file. A file may be stored/hold and designated under a plurality of retention-states depending on a kind of retention protection received for a file. For example, the plurality of retention-states may be designated as NORMAL, WORMED, RETAINED, WORM-RETAINED, DELETED or LEGAL HOLD. A file may further be stored and designated as HELD file such as HELD WORMED and HELD WORM-RETAINED. In some examples, a file of the plurality of files may be stored in the distributed file system 110 under a retention-state according to a retention policy stored in the distributed file system 110. As used herein, the term "retention-state transition" refers to a transition of a file from one retention state to another retention state.

A NORMAL file designation may indicate that the file is mutable, meaning that file content and metadata can be changed (e.g., written to). A NORMAL file may also be deleted. A DELETED file designation indicates that the file might has been deleted (or at least moved to a trash bin of sorts for future deletion). A WORMED file designation indicates that the file may be immutable, meaning that file content and metadata cannot be changed (e.g., written to). A WORMED file may be deleted. A WORM-RETAINED file designation indicates that the file may be immutable, meaning that file content and metadata cannot be changed (e.g., written to). Preventing metadata from being changed may also prevent the location (e.g., in which directory) of the file from being changed. A WORM-RETAINED file may not be deleted. A WORM-RETAINED file may keep this file designation for a defined period of time (e.g., a retention period).

A HELD file designation indicates that the file may not be deleted. In some examples, a HELD file designation (e.g., applicable to HELD WORMED and HELD WORM-RETAINED) may indicate that the file is subject to legal hold. A file may be subjected to legal hold if, for example, an entity (e.g., a government agency) specifically requests the file to be held. Legal hold may keep the file designation 'LEGAL HOLD' for an indefinite period of time, for example, until the system administrator removes the 'LEGAL HOLD' designation from the file (e.g., in response to the entity indicating to the system administrator that the legal hold has been removed). The LEGAL HOLD file designation indicates that the file may not be deleted. A file may be designated with both a LEGAL HOLD designation and a WORMED or WORM-RETAINED designation. A LEGAL HOLD file designated may change HELD WORMED-RETAINED designation to HELD WORMED designation and vice versa. If the LEGAL HOLD designation is removed from a HELD WORM-RETAINED file, the file may remain a WORM-RETAINED file. If the LEGAL HOLD designation is removed from a HELD WORMED file, the file may remain a WORMED file.

In the example illustrated in FIG. 1, the signature generation service 118 may generate a signature key by combining the signature of metadata of the file and the signature of data content of the file. In examples described herein, the signature key may be included to a block of the distributed ledger 122 while creating the block for an action performed while performing a transaction in relation to the file. Any functionality described herein as performed by the signature generation service 118 may be performed by at least one processing resource executing instructions to perform the functionality described herein.

The management device 124 may be a computing device that may be any suitable type of computing device as described herein. For the sake of simplicity, the functions performed by at least one processing resource in the management device 124 may be considered to be performed by the blockchain system 120, as described throughout the specification. In other words, most of the functionalities described herein as performed by blockchain system 120 may be performed by instructions stored on at least one machine readable storage medium of the management device 124, executed by the at least one processing resource of the management device 124. The at least one machine readable storage medium may be non-transitory and alternatively referred to as a non-transitory machine readable medium. The at least one machine readable storage medium may be implemented by volatile memory (e.g., one or more volatile memory devices, such as DRAM device(s), DIMM(s), or the like).

In some examples, the management device 124 may include a first processing resource 200 to maintain the blockchain system 120 (for example, creating blocks in the distributed ledger 122) for the distributed file system, a second processing resource 400 (FIG. 4) to determine a location of a file stored in the distributed file system, or both the first processing resource 200 and the second processing resource 400.

Figure 2:
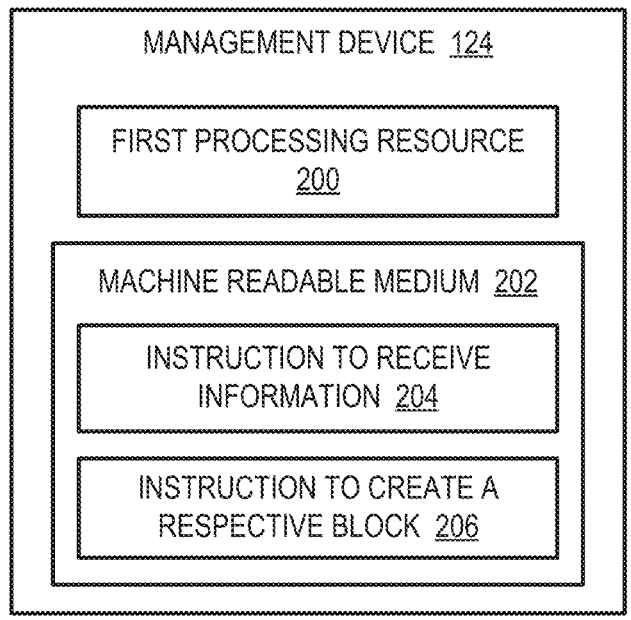
FIG. 2 is a block diagram of an example management device of a blockchain system to create a respective block corresponding to each action performed while performing a transaction in relation to a file stored in a distributed file system.

FIG. 2 is a block diagram of an example of the management device 124 of FIG. 1. As illustrated in FIG. 2, the management device 124 may include a first processing resource 200 and a machine readable storage medium 202 comprising (e.g., encoded with) at least instructions 204 and 206 that are executable by the first processing resource 200 of the management device 124 to implement functionalities described herein in relation to instructions 204 and 206.

In the examples described herein, most of the functionalities described herein in relation to instructions 204 and 206 executed by the first processing resource 200 of the management device 124 may be described as performed by the blockchain system 120.

Figure 3:
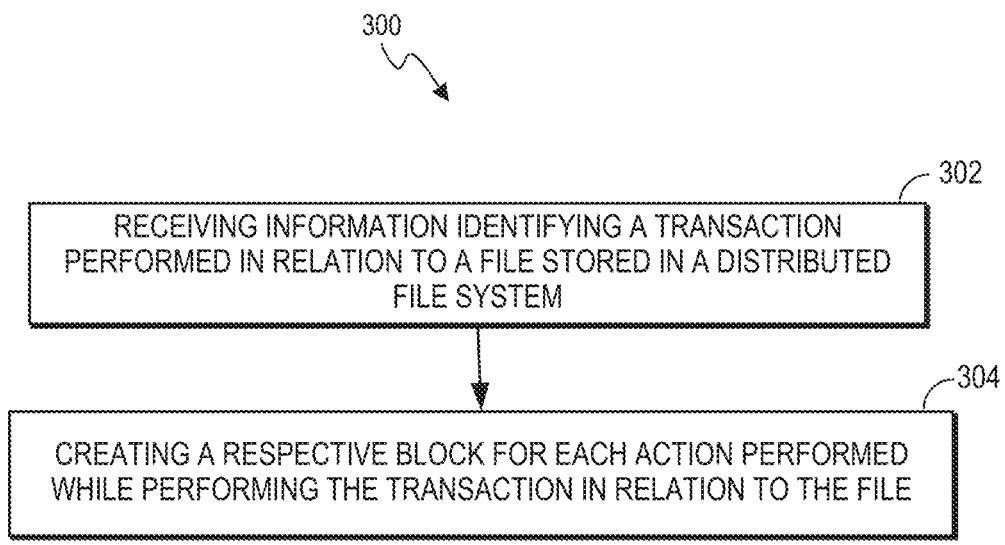
FIG. 3 is a flowchart of an example method that includes creating, in a blockchain system, a respective block corresponding to each action performed while performing a transaction in relation to a file stored in a distributed file system.

FIG. 3 is a flowchart of an example method 300 for maintaining the blockchain system 120. The execution of method 300, is described in details below with reference to FIGS. 2 and 3. Although the below description is described with reference to the management device 124 of FIG. 2, however other computing devices suitable for the execution of method 300 may be utilized. Additionally, implementation of method 300 is not limited to such examples. Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof.

At 302 of the method 200 (FIG. 3), instruction 204 of the management device 124 of FIG. 2, may (e.g., when executed by the first processing resource 130) receive information identifying a transaction performed in relation to a file stored in distributed fie system 110. In an example, instruction 204 may receive information identifying an action performed while performing the transaction in relation to a file stored in distributed fie system 110. In some examples, the information identifying the transaction may include information identifying an action performed while performing an operation (described previously) on the file. Along with information identifying the transaction, one or more of information identifying a latest location of the file, a signature of metadata of the file or a tag associated with the file and various additional file attributes such as status of the file, retention-state of the file, the signature of data content of the file may be received. In example as described herein, instruction 204 may receive information identifying a latest location of the file in the distributed file system 110. In another example, instruction 204 may receive one or more of information identifying a signature of metadata of the file or a signature of the data content of the file. In yet another example, instruction 204 may receive a tag associated with the file.

At 304 of the method 300, instruction 206 may create a respective block for each action performed while performing the transaction in relation to the file. In an example, each created block may include information identifying an action performed while performing the transaction and a block signature of the prior block. The created block may further include one or more of information identifying the latest location of the file, the signature of metadata of the file or the tag associated with the file, received from the distributed file system 110. In some examples, the method 300 may include validating one or more blocks in the distributed ledger 122, created before the creation of the respective created block. In such examples, the method 300 may include validating the transaction performed in relation to the file before creating the respective block(s). This validation may be performed by the participating entities. In an example, the participating entities may approve (e.g., by providing consensuses) the transaction performed in relation to the file by determining whether the transaction performed may be an operation (that may be allowed to be performed on the file) as per the smart contract 126.

Figure 4:
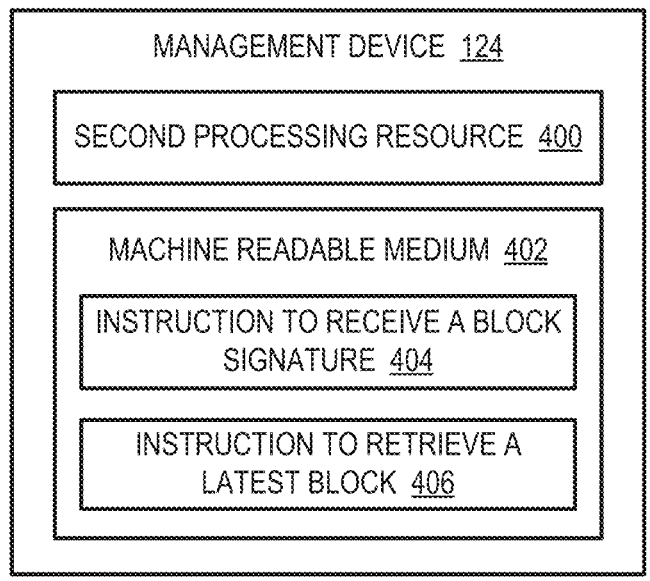
FIG. 4 is a block diagram of an example management device of a blockchain system to retrieve a latest block, from the blockchain system, corresponding to a file stored in a distributed file system.

In some examples of the present subject matter, FIG. 4 is a block diagram of an example of the management device 124. As illustrated in FIG. 4, the management device 124 includes a second processing resource 400 and a machine readable storage medium 402 comprising (e.g., encoded with) at least instructions 404 and 406, that are executable by the second processing resource 400 of the management device 124 to implement functionalities described herein in relation to instructions 404 and 406. The machine readable storage medium 402 may be same or different from the machine readable storage medium 202 (FIG. 2). In an example, at least instructions 404 and 406 executable by the second processing resource 400 may be included in the machine readable storage medium 202. The at least instructions 404 and 406 of FIG. 4, when executed by the second processing resource 400, may implement various aspects of determining a location of a file stored in a distributed file system through a blockchain system associated with the distributed file system.

In the examples described herein, most of the functionalities described herein in relation to instructions 404 and 406 executed by the second processing resource 400 of the management device 124 may be described as performed by the blockchain system 120.

Figure 5:
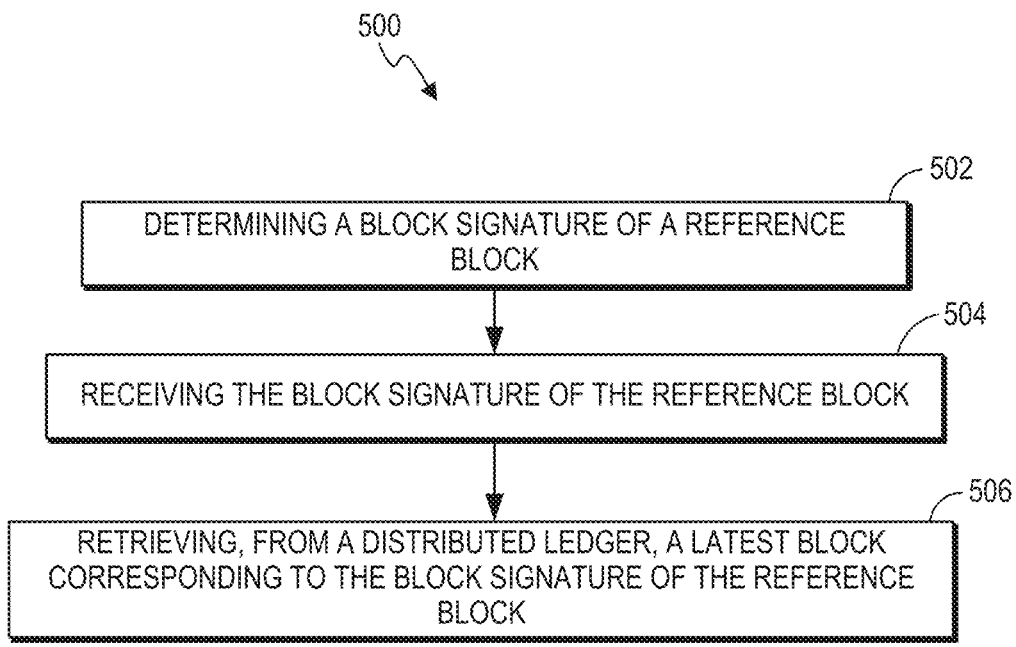
FIG. 5 is a flowchart of an example method for identifying, through a blockchain system, a file stored in a distributed file system.
Figure 6:
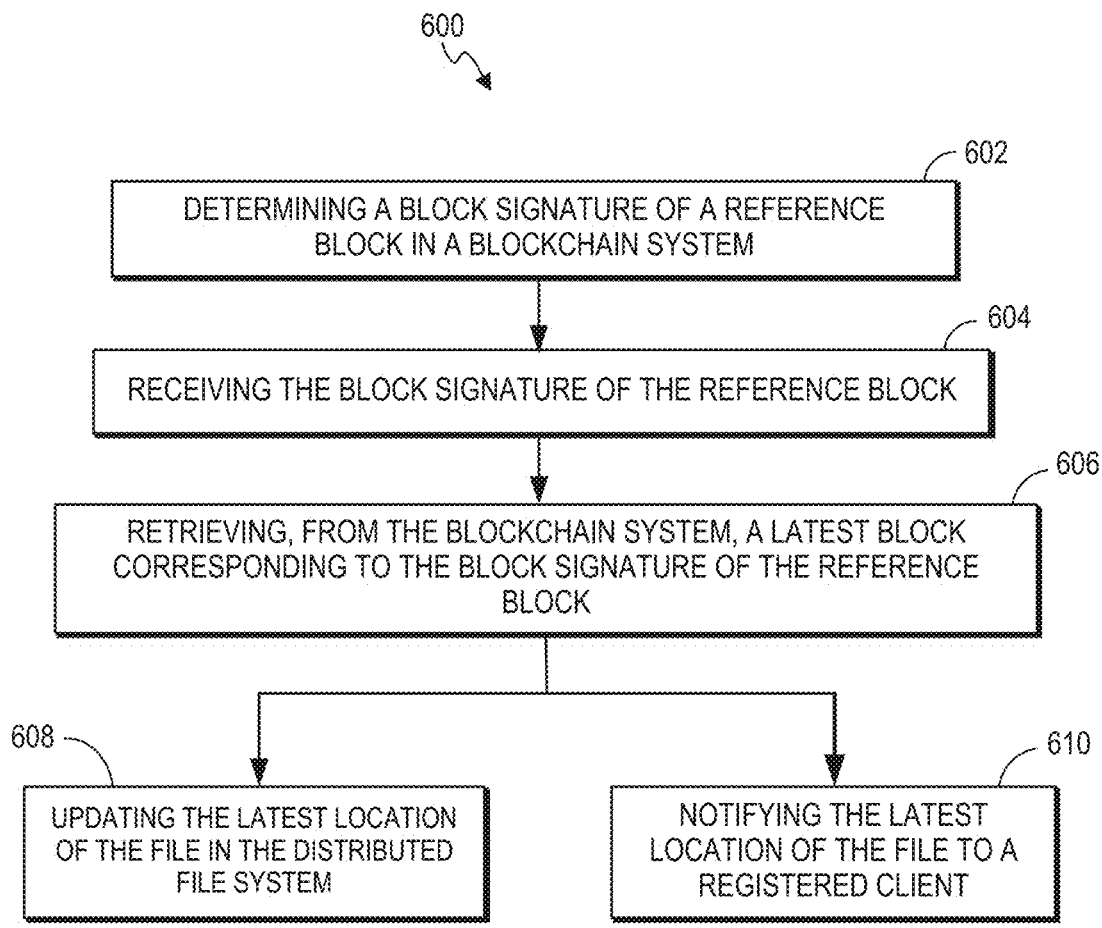
FIG. 6 is a flowchart of another example method for identifying, through a blockchain system, a file stored in a distributed file system.

The instruction 404, when executed, may cause the second processing resource 402 to receive a block signature of a reference block of the distributed ledger 122 in the blockchain system 120, that reference block corresponds to a file stored in a distributed file system 110. In some examples, the instruction 406, when executed, may cause the second processing resource 402 to retrieve a latest block corresponding the block signature of the reference block from the distributed ledger 122. The instructions 404-406 may include various instructions to execute at least a part of the methods described in FIGS. 5 and 6 (described later). Also, although not shown in FIG. 4, the machine readable medium 402 may also include additional program instructions to perform various other method blocks described in FIGS. 5 and 6. Although the flowcharts of FIGS. 5 and 6 show specific orders of performance of certain functionalities, method 500 and method 600, individually, are not limited to that order. For example, the functionalities shown in succession in the flowcharts may be performed in a different order, may be executed concurrently or with partial concurrence, or a combination thereof. Although the below method description is described with reference to the management device 124 of FIG. 4, however other computing devices suitable for the execution of methods 500 and 600, may be utilized.

As used herein, the term "reference block" refers to a block of the distributed ledger 122 for which a corresponding block signature is either available to a client or available in the repository 114 of the distributed file system 110. In an example, the reference block may be a block existing previous to a latest block in the distributed ledger 122 corresponding to the file. In another example, no transaction might have performed in relation to the file in the distributed file system 110. In such example, the reference block may be the latest block in the distributed ledger 122, corresponding to the file.

FIG. 5 is a flow chart depicting an example method 500 to determine a latest location of a file stored in a distributed file system through a blockchain system associated with the distributed file system, in accordance with an example. For ease of illustration, the method 500 will be described with reference to FIG. 1. In an example, determining a latest location of a file may include identifying a file corresponding to a file name, a namespace, or a tag associated with the file and then determine a latest location of the file. In some examples, determining a latest location of a file may be requested by a client/user 'C', a third party agency 'A' (e.g., a third party agency that may be assigned to audit the file) or both. The client/user 'C', the third party agency 'A' or both may or may not be a participating entity of the blockchain system 120. In some examples, the client/user 'C' may directly access the distributed ledger 122 in the blockchain system 120 or access the distributed ledger 122 via the distributed file system 110 to determine the latest location the file. In such examples, the decentralized file system of the distributed file system 110, may access the blockchain system 120 to determine the latest location the file.

Referring to FIG. 5, at 502, the method 500 may include determining the block signature of the reference block that corresponds to the file, in the distributed ledger 122, by the management device 124. In examples described herein, the block signature of the reference block that corresponds to the file may be determined by identifying the file corresponding to a file name, a namespace, or a tag associated with the file. In an example, determining the block signature of the reference block corresponding to the file may include determining the block signature corresponding to a file name of the file. In some examples, the block signature of the reference block corresponding to the file name of the file, the namespace of the file or the tag associated with the file may be determined from the repository 114. In some examples, determining the block signature of the reference block corresponding to the file may include determining the block signature from a notification received from the blockchain system 120 for example, to a client/user 'C' if the client/user 'C' is registered client who may have enrolled for the blockchain system 120. A client/user 'C' may enroll for the blockchain system 120, according to a registration model, to access the blockchain system 120 as well as receive notifications from the blockchain system 120 when a block is created corresponding an action performed while performing a transaction in relation to the file. The notification may include the block signature of the created block corresponding to the action performed while performing the transaction in relation to the file. In some examples, the enrollment may be a part of an overall blockchain system for a client/user 'C'. In some examples, a third party agency 'A' may have to get enrolled through the registration model.

At 504, the method 500 may include receiving the block signature of the reference block that corresponds to the file, by the management device 124. The block signature may be received by the management device 124 from a client/user 'C' (e.g., when the client/user may have received the block signature through a notification) or the distributed file system 110. At 506, the method 500 may include retrieving, by the management device 124, the latest block from the distributed ledger 122, corresponding to the block signature of the reference block. In the examples described herein, the latest block may include one or more of information identifying a latest location of the file, a signature of the metadata of the file or a tag associated with the file.

In an example, retrieving the latest block may include identifying a latest location of the file from the latest block of the distributed ledger 122. The latest location may be the latest location of the file at an instant when the latest block might have created for an action performed while performing the latest (i.e., most recent) transaction in relation to the file. In an example, information identifying the latest location of the file may include a latest directory path for the file in the distributed file system 110.

In an example, the method 500, at 506, may include retrieving information identifying a signature of metadata of the file. In such examples, the information identifying the signature of metadata of the file may include a signature key that may include the signature of metadata of the file and a signature of the data content of the file. In an example, the method 500, at 506, may include retrieving information identifying a tag associated with the file. In some of these examples, the latest location of the file can be retrieved from the latest block, after identifying the file corresponding the tag or the signature of the metadata of the file from the latest block of the distributed ledger 122. By using such methods, a set of files corresponding to the signature of metadata or a tag may be identified through the blockchain system 120.

In some examples, the method 500 may include identifying a set of files (that are stored in the distributed file system 110) that may be associated with a given tag, through the blockchain system 120. In such examples, the set of files corresponding to the given tag may be identified from information retrieved from latest blocks retrieved corresponding to multiple files stored in the distributed file system 110. In an example, the multiple files may belong to a client. In some examples, the latest blocks corresponding to multiple files that correspond to the given namespace may be retrieved to identify the set of files. Further, the latest locations of the respective files of the set of files can be determined based on information retrieved from respective latest blocks. In some examples, after identifying the files of the set of files and determining their latest locations, audit on the files of the set of files may be performed to validate their integrity and consistency. In an example, audit on the files may be performed using the blockchain system 120. For example, all medical files tagged with 'x-ray' may be identified, their latest locations may be determined and audited to validate whether the files in the set of files are consistent or one or more files in the set of files may be tampered.

In some examples, the distributed file system 110 may include another set of files corresponding to a given namespace. In such examples, for another set of files in the given namespace, the method 500 may include determining respective block signatures of respective reference blocks corresponding to the files of another set from the repository 114 of the distributed file system 110. In an example, the method may include retrieving, from the distributed ledger 122, respective latest blocks corresponding to each block signature of respective reference blocks. In some examples, another set of files corresponding to the given namespace may be identified from information retrieved from latest blocks retrieved corresponding to multiple files. In an example, the multiple files may belong to a client. In such examples, the latest blocks corresponding to multiple files corresponding to the given namespace may be retrieved to identify another set of files. Further, the latest locations of the files of plurality of files can be retrieved from the respective latest blocks. By identifying another set of files and their latest locations, audit on another set of files corresponding to the given namespace may be performed to validate their integrity and consistency.

As described, the described method can be performed to retrieve a latest block, from the distributed ledger 122, corresponding to one or more files that use a tag or belong to a namespace by using the tag or namespace as filtering parameter. The latest locations of respective files in the distributed file system 110 may be determined and audit on the one or more files may be performed through the blockchain system 120.

Turning now to FIG. 6, a flow diagram depicting a method 600, in accordance with some examples. FIG. 6 will be described in conjunction with FIG. 5. The method blocks 602, 604 and 606 may be analogous (similar), respectively, to method blocks 502, 504 and 506 of FIG. 5. In an example, at block 608, the method 600 may include updating the latest location (that is retrieved from the latest block of the distributed ledger 122) of the file in the repository 114 of the distributed file system 110. In another example, at block 610, the method 600 may include sending a notification to a registered client (as described previously), that notification may include information retrieved from the latest block of the distributed ledger 122.

Some aspects of the present subject matter further describes a method of performing audit on one or more files stored in the distributed file system 110 through the blockchain system 120. Although the method may be used for auditing multiple files, the method of performing audit is described below with reference to one file, for the sake of simplicity. For ease of illustration, the method 500 will be described with reference to FIG. 1. In an example, an auditing system for example, the auditing system 150 may be used for auditing a file stored in the distributed file system 110 through the blockchain system 120. The auditing system 150 may be an external system or a part of the blockchain system 120, that is in communication with the blockchain system 120. As an external system, in an example, the auditing system 150 may be associated with a third party agency.

Figure 7:
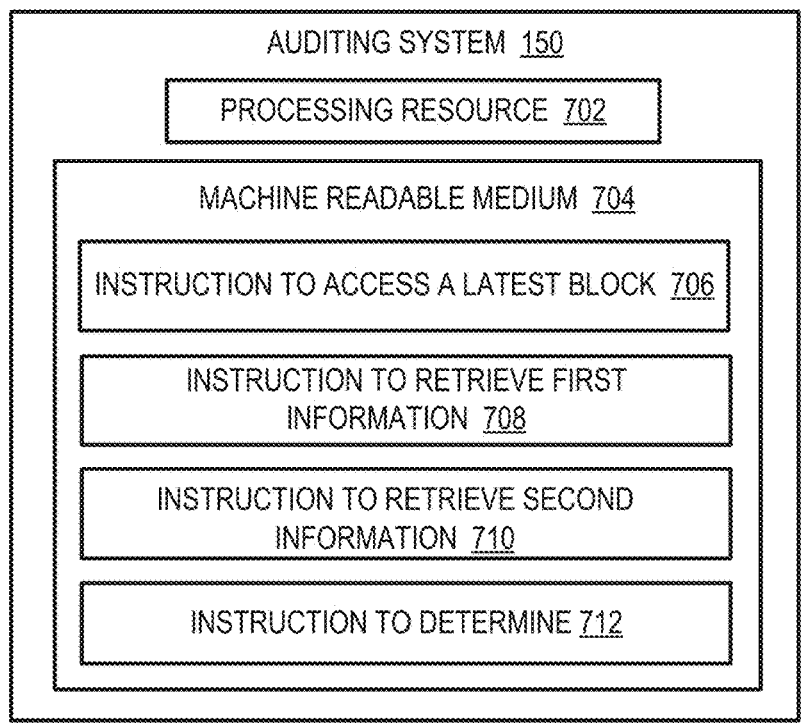
FIG. 7 is a block diagram of an example auditing system to perform audit of a file stored in a distributed file system through a blockchain system to validate its consistency.

FIG. 7 is a block diagram of an example auditing system 150 that comprises a processing resource 702 and a machine readable storage medium 704 comprising (e.g., encoded with) at least instructions 706, 708, 710 and 712 that are executable by the processing resource 702 of the auditing system 150 to implement functionalities described herein in relation to instructions 706, 708, 710 and 712. The auditing system 150 may be a computing system as described herein. The machine readable storage medium 704 may be non-transitory and alternatively referred to as a non-transitory machine readable medium. The machine readable storage medium 704 may be implemented by volatile memory (e.g., one or more volatile memory devices, such as DRAM device(s), DIMM(s), or the like).

Figure 8:
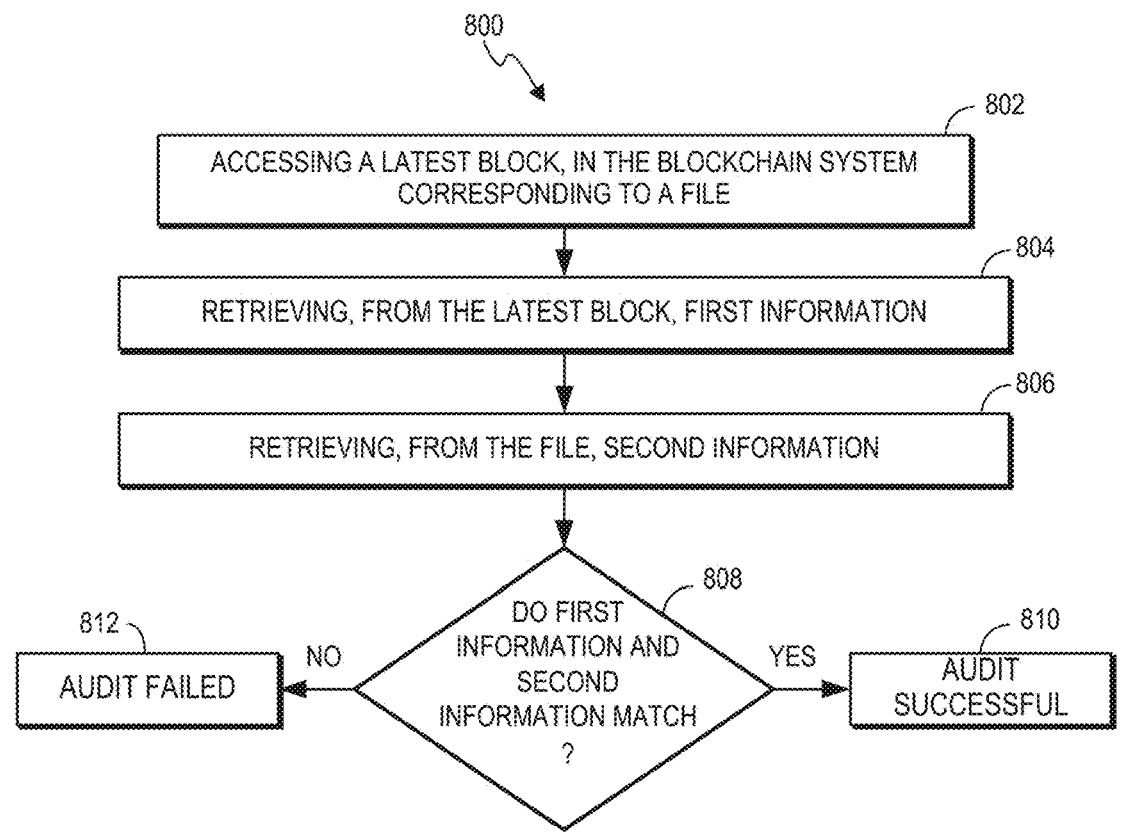
FIG. 8 is a flowchart of an example method for performing audit of a file stored in a distributed file system through a blockchain system to validate its consistency.

FIG. 8 is a flowchart of an example method 800 for performing audit on a file (i.e., auditing a file) using the blockchain system 120. In an example, the method 800 of auditing the file may be performed to validate its integrity and consistency. The execution of method 800, is described in details below with reference to FIGS. 7 and 8. Although the below description is described with reference to the auditing system 150 of FIG. 7, however other computing devices suitable for the execution of method 800 may be utilized. Additionally, implementation of method 800 is not limited to such examples. Although the flowchart of FIG. 8 shows a specific order of performance of certain functionalities, method 800 is not limited to that order. For example, the functionalities shown in succession in the flowchart may be performed in a different order, may be executed concurrently or with partial concurrence, or a combination thereof. The instructions 706-712 may include various instructions to execute at least a part of the methods described in FIG. 8. Also, although not shown in FIG. 7, the machine readable medium 704 may also include additional program instructions to perform various other method blocks described with reference to FIG. 8.

At 802 of the method 800, instructions 706 of the auditing system 150 of FIG. 7, may (e.g., when executed by the processing resource 150) access a latest block of the distributed ledger 122, in the blockchain system 120, corresponding to a file stored in the distributed file system 110. The latest block may be accessed by retrieving the latest block corresponding a block signature of a reference block that corresponds to the file, as described above with respect to FIG. 5. In an example, the process of determining a latest location of the file in the distributed file system 110, as described with respect to FIGS. 4 and 5, may be performed by the auditing system 150. In another example, the auditing system 150 may receive information of the latest block or the latest location of the file from the management device 124. The latest block may include one or more of information identifying a latest location of the file, a signature of metadata of the file, or a tag associated of the file. In an example, the latest block may include a signature key that includes the signature of metadata of the file and the signature of data content of the file.

At 804 of the method 800, instruction 708 may retrieve first information including one or more of the signature of metadata of the file or the signature of data content of the file from the latest block. In an example, the latest block comprises the signature key that includes the signature of metadata of the file and the signature of data content of the file. In such example, the instruction 708 may determine the first information including the signature of metadata and the signature of data content of the file from the signature key retrieved from the latest block of the distributed ledger 122. At 806 of the method 800, instruction 710 may retrieve second information including one or more of a signature of metadata of the file or a signature of data content of the file from the distributed file system 110. In an example, the second information may comprise the signature of metadata and the signature of data content. In some examples, the instruction 710 may retrieve second information from the file itself by accessing the file from the latest location of the file in the distributed file system 110 and computing the file to retrieve second information. The latest location of the file may be determined from the latest block. In some examples, second information may be retrieved from the repository 114 of the file system.

At 808 of the method 800, instruction 712 may determine whether first information matches second information. In an example, at 808 of the method 800, the instruction 712 may further generate a report that includes comparison of first information and second information to present whether first information matches second information. In an example, first information matches second information. In such example, at 810, the method 800 may include generating a report that may show 'successful audit.' In another example first information does not match second information. In such example, at 812, the method 800 may include generating a report that may show 'failed audit.' 'Failed audit' may indicate that the file may have been tampered. In such examples, the file may be accessed from the latest location of the file to check the tampered file. In some examples, the method 800 of audit may be performed on multiple files stored in the distributed file system 110, using the blockchain system 120, to validate their integrity and consistency.

In some examples, the file may be stored in the distributed file system 110 under a compliance standard. In some of these examples, the method 800 of audit on the file may further include performing compliance audit on the file. In such examples, the method 800 may include determining whether the file comply with compliance standards. In some examples, the method 800 may further include generating a compliance report that includes whether the file is compliance or not as per the compliance standards. For example, a file may be stored in distributed file system under a retention state. On performing audit for the file, first, it may be determined whether the file is consistent (for example, not tampered) by using the process as described with reference to FIGS. 7 and 8. Second, the compliance audit may be further performed to check whether the file is preserved in a designated retention-state for a period of time as per the retention policy or not.

In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage system, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1, 2, 4, and 7, distributed file system 110, blockchain system 120, management device 124 and auditing system 150 may each be implemented by one machine-readable storage medium, or multiple machine-readable storage media.

We claim:

1. A method comprising:
performing, by a distributed file system, a transaction on a file stored in one or more storage systems of the distributed file system;
sending, from the distributed file system to a blockchain system associated with the distributed file system, information identifying the transaction performed on the file and a signature key comprising a signature of metadata of the file and a signature of data content of the file;
in the blockchain system, creating a respective block of a blockchain for each corresponding action performed while the distributed file system performs the transaction on the file, wherein the respective block comprises information identifying the corresponding action of the transaction, the signature key, information identifying a latest location of the file, and a block signature of a prior block; and
validating the file using the signature key included in a latest block of the blockchain for the file.

2. The method of claim 1, wherein the validating of the file comprises:
determining first information based on the signature key included in the latest block,
computing second information based on the file retrieved from the distributed file system, and
comparing the first information to the second information.

3. The method of claim 1, wherein the information identifying the latest location of the file comprises a latest directory path for the file in the distributed file system.

4. The method of claim 2, wherein determining the first information comprises obtaining from the signature key the signature of the metadata of the file and the signature of the data content of the file, and
wherein computing the second information comprises computing a signature of metadata of the file retrieved from the distributed file system and a signature of data content of the file retrieved from the distributed file system.

5. The method of claim 1, wherein the transaction comprises one or more of a file operation, an operation to access the file, an operation to change a status of the file, an operation to change a location of the file, or an operation corresponding a retention-state transition of the file.

6. The method of claim 1, comprising validating one or more blocks, in the blockchain, created before the creation of the respective block.

7. The method of claim 4, wherein the validating of the file comprises:
indicating a successful validation of the file in response to the first information matching the second information.

8. The method of claim 2, comprising:
retrieving the file from the distributed file system at a latest location of the file included in the latest block.

9. The method of claim 1, wherein the validating is performed by the blockchain system.

10. The method of claim 1, wherein the validating is performed by a computer system separate from the blockchain system.

11. The method of claim 1, wherein the corresponding action changes the metadata of the file or the data content of the file.

12. The method of claim 11, wherein a first signature key for the file included in a first block of the blockchain for the file is different from a second signature key for the file included in a second block of the blockchain for the file.

13. The method of claim 1, further comprising:
receiving, at the blockchain system, a block signature of a reference block belonging to a distributed ledger of the blockchain system, the reference block corresponding to a first file stored in the distributed file system associated with the blockchain system; and
retrieving, by the blockchain system from the distributed ledger, a latest block corresponding to the block signature of the reference block.

14. The method of claim 13, wherein the latest block corresponding to the block signature of the reference block and the reference block both correspond to the file, and the reference block is created before the latest block corresponding to the block signature of the reference block.

15. A non-transitory machine-readable storage medium comprising instructions that upon execution cause a system to:
perform, at a distributed file system, a transaction on a file stored in one or more storage systems of the distributed file system;
send, from the distributed file system to a blockchain system associated with the distributed file system, information identifying the transaction performed on the file and a signature key comprising a signature of metadata of the file and a signature of data content of the file;
create, in the blockchain system, a respective block of a blockchain for each corresponding action performed while the distributed file system performs the transaction on the file, wherein the respective block comprises information identifying the corresponding action of the transaction, the signature key, information identifying a latest location of the file, and a block signature of a prior block; and
validate the file using the signature key included in a latest block of the blockchain for the file.

16. The non-transitory machine-readable storage medium of claim 15, wherein the validating of the file comprises:
determining first information based on the signature key included in the latest block,
computing second information based on the file retrieved from the distributed file system, and
comparing the first information to the second information.

17. The non-transitory machine-readable storage medium of claim 16, wherein determining the first information comprises obtaining from the signature key the signature of the metadata of the file and the signature of the data content of the file, and
wherein computing the second information comprises computing a signature of metadata of the file retrieved from the distributed file system and a signature of data content of the file retrieved from the distributed file system.

18. The non-transitory machine-readable storage medium of claim 16, wherein the validating of the file comprises:
indicating a successful validation of the file in response to the first information matching the second information.

19. A system comprising:
a distributed file system; and a blockchain system associated with the distributed file system, the distributed file system to:
  perform a transaction on a file stored in one or more storage systems of the distributed file system;
  send, from the distributed file system to the blockchain system, information identifying the transaction performed on the file and a signature key comprising a signature of metadata of the file and a signature of data content of the file, the blockchain system to:
  create, in the blockchain system, a respective block of a blockchain for each corresponding action performed while the distributed file system performs the transaction on the file, wherein the respective block comprises information identifying the corresponding action of the transaction, the signature key, information identifying a latest location of the file, and a block signature of a prior block; and
  validate the file using the signature key included in a latest block of the blockchain for the file.

20. The system of claim 19, wherein the blockchain system is to validate the file by:
  determining first information based on the signature key included in the latest block,
  computing second information based on the file retrieved from the distributed file system, and
  comparing the first information to the second information.

21. The system of claim 20, wherein the blockchain system is to indicate a successful validation of the file in response to the first information matching the second information.

* * * * *